(No Model.)  2 Sheets—Sheet 1.

C. WAGNER.
APPARATUS FOR PREPARING LIQUID COFFEE.

No. 399,803. Patented Mar. 19, 1889.

Witnesses:
Joseph Purath
Carl Gregor

Inventor:
Carl Wagner
by Heurusaly
Att'ies.

(No Model.) 2 Sheets—Sheet 2.

C. WAGNER.
APPARATUS FOR PREPARING LIQUID COFFEE.

No. 399,803. Patented Mar. 19, 1889.

Witnesses:
Joseph Purath
Carl Gregor

Inventor:
Carl Wagner
by
H. W. Eversley
Att'ies.

United States Patent Office.

CARL WAGNER, OF DRESDEN, SAXONY, GERMANY.

APPARATUS FOR PREPARING LIQUID COFFEE.

SPECIFICATION forming part of Letters Patent No. 399,803, dated March 19, 1889.

Application filed March 23, 1888. Serial No. 268,252. (No model.) Patented in Germany May 3, 1887, No. 41,649.

*To all whom it may concern:*

Be it known that I, CARL WAGNER, manufacturer, of Dresden, in the Kingdom of Saxony and German Empire, have invented an Improved Apparatus for Preparing a Liquid Coffee Drink of Fresh Unroasted Coffee, (for which I have obtained a patent in Germany under No. 41,649, dated May 3, 1887,) of which the following is a specification.

My invention relates to an improved apparatus for preparing liquid coffee drink of fresh unroasted coffee, the coffee-beans being first roasted and then ground in the machine and the beverage prepared with the water boiled in the machine.

Figure 1:
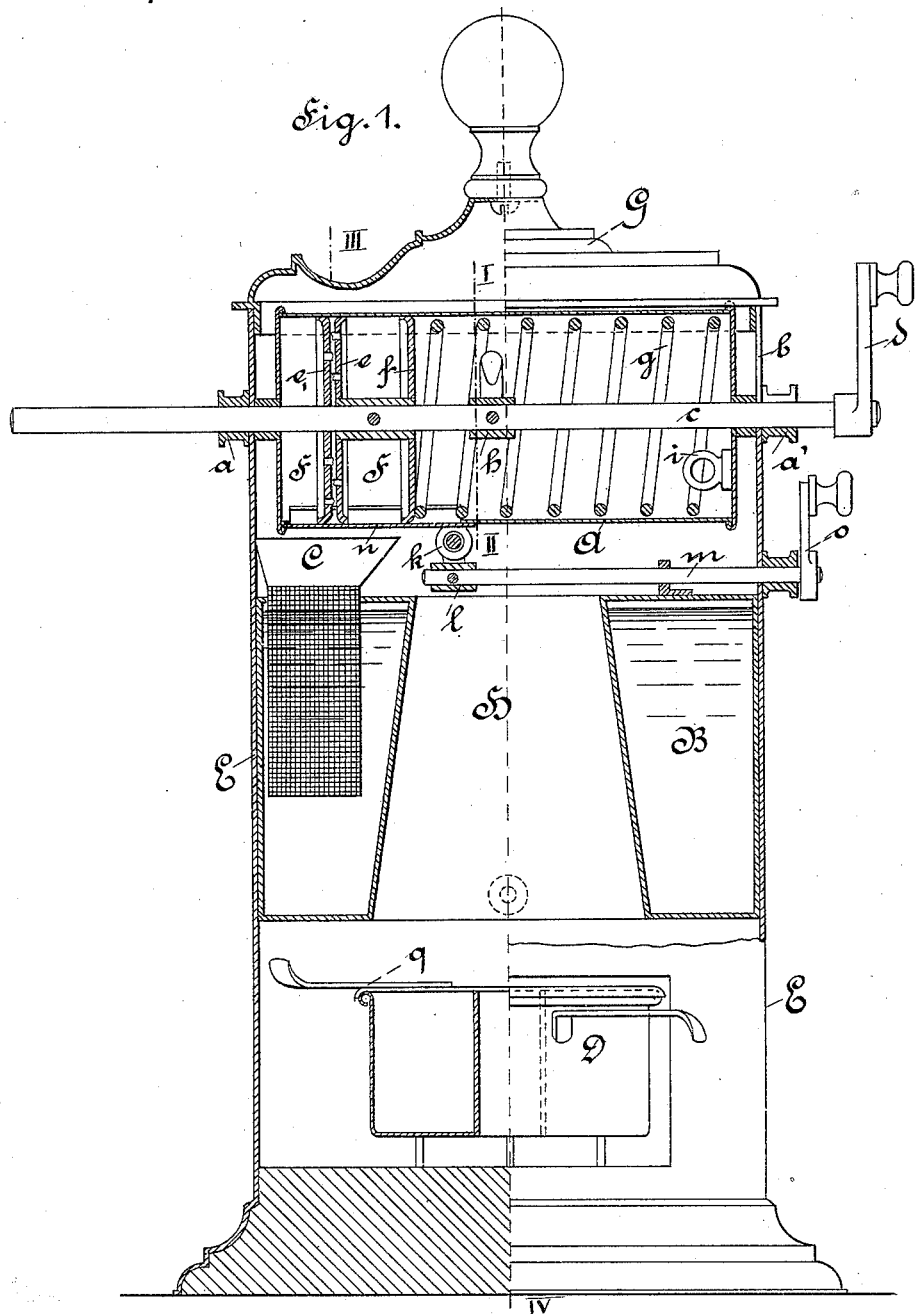
Figure 2:
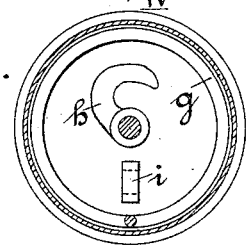
Figure 3:
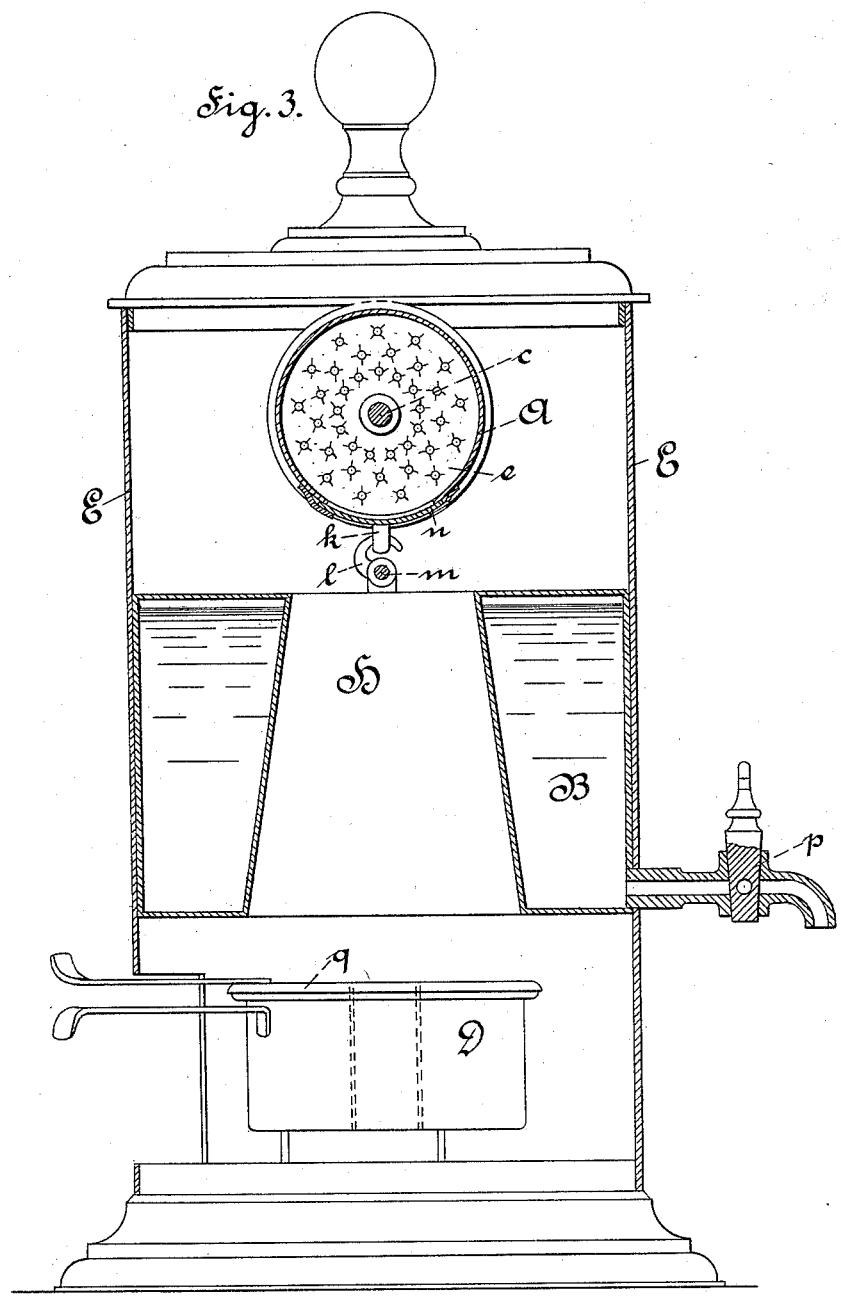

In the accompanying drawings, Figure 1 is a longitudinal section through the machine, some parts on the right-hand side of which are shown in full view. Fig. 2 is a cross-section through the roasting and grinding drum on the line 1 2. Fig. 3 shows a cross-section through the whole machine on the line 3 4. A full view of the lid is given.

The machine consists of the following parts: the roasting-drum A, in which the coffee-beans are roasted and ground; the boiler B, underneath the drum A, for boiling the water as required for the beverage; the strainer C, for immersing the ground coffee into the boiler B; and the lamp D.

The above parts are inclosed in the casing E.

The drum A is so arranged as to rotate at $a$ $a'$ in the casing E. The latter is provided at $b$ with a slit, through which the shaft $c$, together with the drum A, can be removed from the casing. The shaft $c$ has on one end a small handle, $d$, and is so movably arranged as to slide in the drum A. On the shaft $c$ is secured a grinding-disk, $e$, with a sheet-plate, $f$. A screw-spring, $g$, fixed in the drum A, presses the grinding-disk $e$ against a second grinding-disk, $e'$, secured in the drum A. Fixed to the shaft $c$ is a hook, $h$, which catches in the eye $i$ whenever the shaft $c$ is drawn back. In addition to the above, the drum A is provided with a slide, $n$, that has an eye, $k$, on its one side. The hook $l$ on the shaft $m$, which is movably arranged, so as to slide in the casing E, can catch in the eye $k$ whenever the shaft $m$ is turned in the corresponding direction by means of the handle $o$. Underneath the slide $n$ the strainer C is arranged, into which the ground coffee is put. The grinding-disks $e$ $e'$ are provided, like rasps, with grinding-edges and holes in such a way that the roasted coffee put in between these two grinding-disks is pulled in a ground condition to the spaces F F of the drum A whenever the grinding-disk $e$ is made to rotate against the other grinding-disk, $e'$. The strainer C is immersed in the boiler B, which is filled with the water required for the beverage. The boiler B is a cylinder with a conical space, H, in its middle, and is provided with a cock, $p$, to let off the coffee beverage when prepared. Underneath the said boiler is the lamp D, the flame of which heats the bottom of the boiler B and its conical sides as soon as the lid $q$ is removed and the flame is lighted. The latter comes also in contact with the drum A and roasts the coffee contained in it.

G is the lid for covering the casing E.

The way in which the apparatus is used is as follows: The drum A is first taken out from the casing E and filled with green coffee-beans. For this purpose the shaft $c$ of the drum A is moved out of the drum A to make the hook $h$ catch in the eye $i$ of the drum. The grinding-disk $e$ is moved with the shaft $c$ to the right, while the other grinding-disk, $e'$, remains on its place, so that a hollow space is formed in the drum A between the grinding-disks $e$ and $e'$, which is filled up with coffee as soon as the slide $n$ is opened. After the drum has been filled the slide $n$ is reversed and the drum A is replaced in the casing E. Prior to that, however, the boiler B is filled with water. Therefore the cock $p$ must be closed and the strainer C has to be taken out, and is put in again when the boiler is full. The lamp D must then be lighted, the flame of which immediately begins to heat the boiler B and the drum A, so that the coffee-beans in the drum A are roasted. During this process the drum A is revolved by means of the handle $d$, the hook $l$ having been taken out of the eye $k$. As soon as the coffee-beans are sufficiently roasted they are ground. This operation is done in the following way: The hook $l$ is laid into the eye $k$ on the slide $n$ of the drum A, and as the slide *n* can move in the drum only in the direction of the axle of shaft *c* the drum is consequently secured by hook *l*. Then the shaft *c* is revolved, so as to disengage the hook *h* from the eye *i*. The grinding-disk *e* must necessarily be pressed by the screw-treated spring *g'* against the grinding-disk *e'*. The latter is fastened to the drum A, which at the same time is held stationary, as just described, whereas the grinding-disk *e* is secured on the shaft *c*. As soon as the shaft *c* is rotated by means of the handle *d*, the grinding-disk *e* must revolve with it, whereas the grinding-disk *e'* remains without motion, so that the coffee-beans between them are ground. The coffee then falls into the spaces F F behind the grinding-disks. In the meantime the water in the boiler B has been made to boil by the flame of the lamp D. On opening the slide *n* the ground coffee in the spaces F F falls into the strainer C and is soaked in the boiling water. The coffee beverage thus prepared is then let off at the cock *p*. As soon as this has been done, the coffee-strainer C is emptied and the function of the apparatus can recommence.

What I claim, and desire to secure by Letters Patent of the United States, is—

1. In an apparatus for preparing liquid coffee, an inclosing-case, a drum for roasting the green berries, a grinding device in connection with the drum, a boiler below the grinding device with a passage thereto for delivering the ground coffee into the water, a heating device below the boiler, and a flue leading to the roasting-drum, substantially as described, for the purpose specified.

2. In an apparatus for preparing liquid coffee, an inclosing-case, a drum for roasting the green berries, a grinding device in connection with the drum, a boiler below the grinding device, a strainer within the boiler having its upper end below the grinding device, a passage from the grinding device to the said strainer, a heating device below the boiler, and a flue leading to the drum, substantially as described, for the purpose specified.

In witness whereof I have hereunto set my hand in presence of two witnesses.

CARL WAGNER.

Witnesses:
ADOLF LUTHER,
EDMUND GÖHLER.